April 15, 1930.  J. W. KOHLHEPP  1,754,562
DEHAIRING MACHINE
Filed Nov. 8, 1927  3 Sheets-Sheet 1
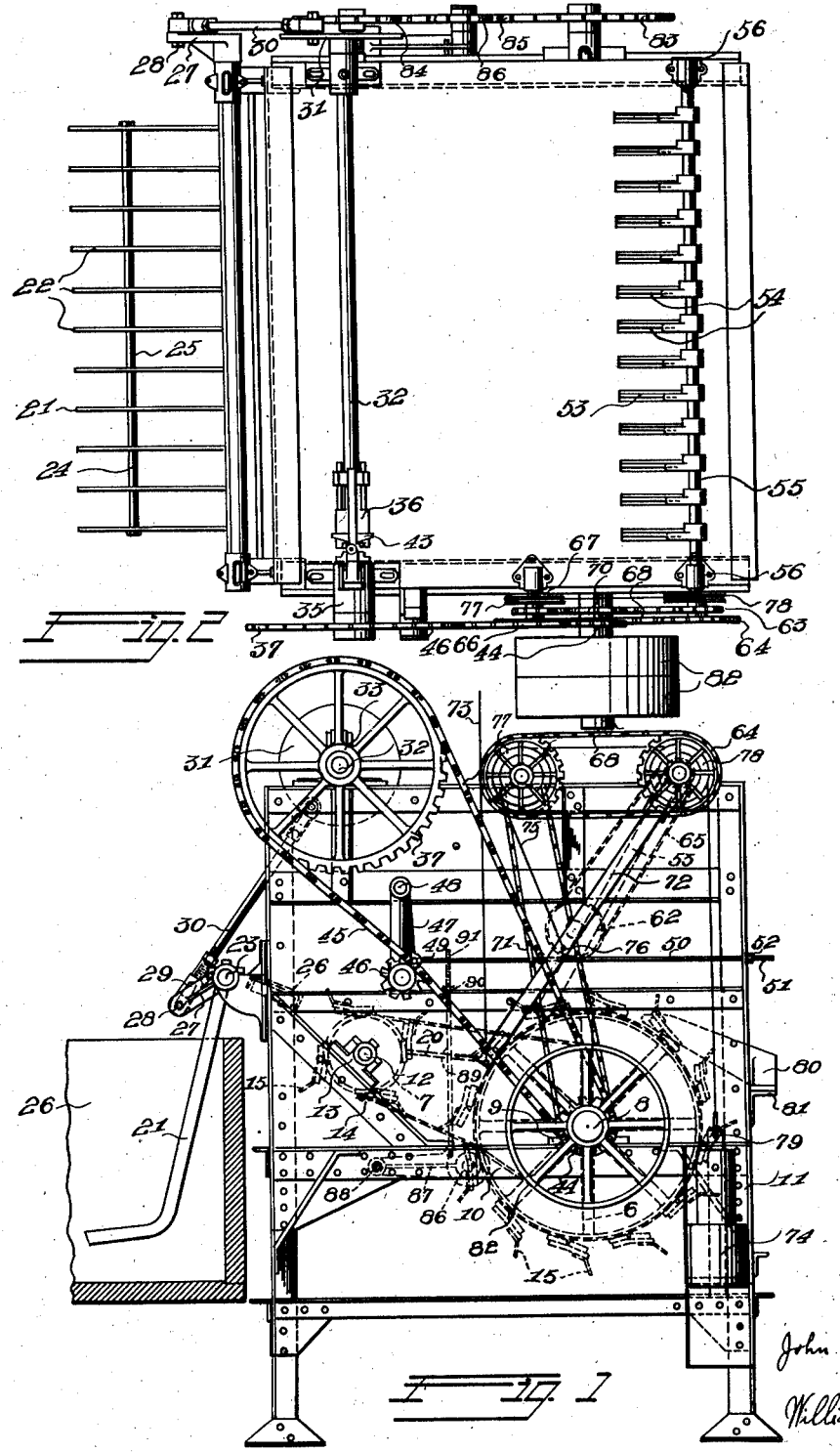

April 15, 1930.   J. W. KOHLHEPP   1,754,562
DEHAIRING MACHINE
Filed Nov. 8, 1927   3 Sheets-Sheet 2

Inventor
John W. Kohlhepp
William A. Strauch
Attorney

April 15, 1930. J. W. KOHLHEPP 1,754,562
DEHAIRING MACHINE
Filed Nov. 8, 1927   3 Sheets-Sheet 3
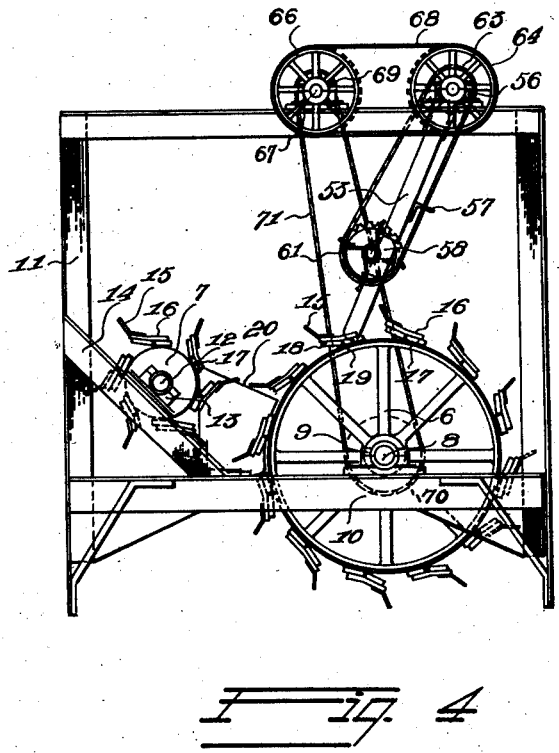
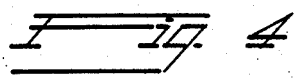
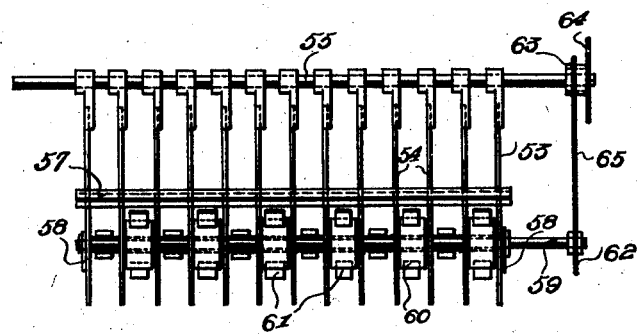
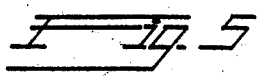
Inventor
John W. Kohlhepp
By William A. Strauch
Attorney Patented Apr. 15, 1930

1,754,562

UNITED STATES PATENT OFFICE

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS

DEHAIRING MACHINE

Application filed November 8, 1927. Serial No. 231,864.

This invention relates to a machine for dehairing the carcasses of hogs of the type involving a plurality of beater drums arranged to rotate the carcass about a longitudinal axis as the beater elements carried by said drums remove the hair. Machines of this type have been before proposed, such as that shown in my prior Patent #1,546,388 granted July 21, 1925. In the operation of the machine of said patent and in other machines heretofore proposed, the arrangement of the beater drums was not such as to maintain the carcass in proper position with respect to the beater elements at substantially all times. As a result such machines were not as efficient as desired in that it was necessary to maintain the carcasses in the dehairing machines a longer time than that required to complete the dehairing operation when the position of the carcass relative to the beater drums is more certainly predetermined.

The primary object of this invention is to produce a dehairing machine that accomplishes its purpose in a minimum of time and with a higher degree of efficiency than was possible by machines heretofore in use. To this end the beater drums are arranged to provide a pocket or depression between them in which the carcass is positioned in the dehairing operation, and in which pocket the spinning of the carcass during the dehairing operation takes place.

A further object of the invention is to provide a dehairing machine having beater drums of varying diameter arranged to rotate about axes that are located on an inclined plane so that tangents to the paths of travel of the beater elements at their uppermost points are relatively close together.

A further object of the invention is to provide beater drums of varying diameter arranged and rotated at different speeds so that the carcasses rotated between them have a tendency to move toward the discharge side of the machine and have no tendency to move in the opposite direction whereby the position of the carcass is maintained automatically by the machine independently of any manual manipulation.

A further object of the invention is to provide the discharge gate with a beater mechanism that is positively rotated to assist in the dehairing operation and to cause any carcasses that may be thrown against said gate to be projected back into the zone of most efficient operation of the beater drums.

A still further object of the invention is to provide an apparatus including means to feed the carcasses to the machine and to discharge them therefrom that are coordinated with the beater drums so that the course of the carcasses is substantially invariable rather than largely indeterminate as heretofore.

Further objects will appear as a description of the invention proceeds with reference to the accompanying drawings in which—

Figure 1 is a side elevation of the improved dehairing machine.

Figure 2 is a plan view thereof.

Figure 4 is a diagrammatic view showing the relative position of the various beater elements.

Figure 5 is a side elevation of the discharge gate and the beater mechanism carried thereby.

Like reference characters indicate like parts throughout the several views.

Figure 3:
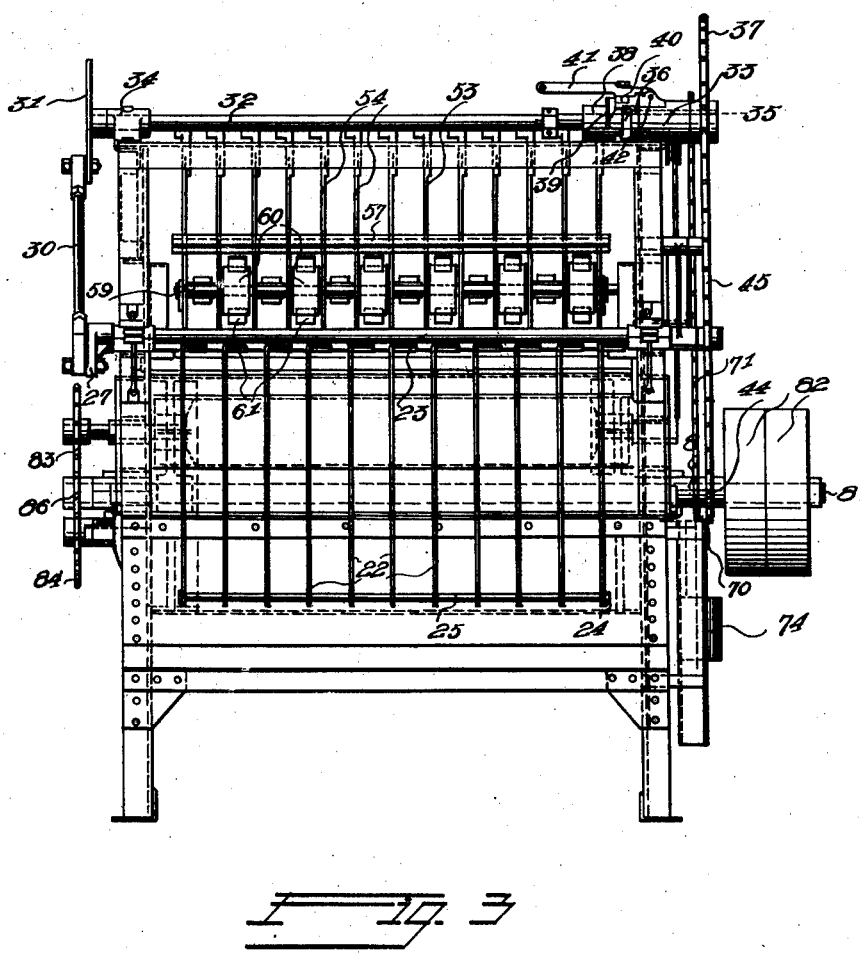
Figure 3 is an elevation of the machine as viewed from the left of Figure 1.

Referring particularly to Figure 4 the dehairing machine comprises a relatively large beater drum 6, and a smaller beater drum 7. Drum 6 rotates as a unit with a shaft 8 suitably journaled as at 9 on cross members 10 of the frame 11 of the machine. Drum 7 rotates as a unit with a shaft 12 journaled at 13 on inclined frame members 14. Mounted on each drum are a plurality of beater elements or blades 15 spaced peripherally around each drum at regular intervals. Said elements are arranged from end to end of the drums 6 and 7 and, preferably, the beaters of drum 6 are arranged opposite the beaters of drum 7, though other arrangements may be used. A degree of flexibility is imparted to beater elements 15 by securing each beater to a flexible member 16, made of material such as heavy canvas. Member 16 is attached at one end to the beater drums by a wooden or heavy canvas block 17, leaving the end of said member to which the beater elements are attached free to flex relative to the drum. A wooden or heavy canvas block 18 is preferably secured to the free end of member 16 with an end abutting against a block 19 secured to the drum. The block 19 is so formed that the free end of member 16 is bent slightly between its ends so that said end extends away from the drum. As clearly shown in the drawings the operative ends of beater elements 15 are bent outwardly between the ends thereof so that said elements extend in a direction that is approximately radial of the drum on which they are mounted.

As clearly shown in Figure 4, the axes of rotation of drums 6 and 7 are located on an inclined plane, and the paths of travel of the beater elements are spaced at their nearest point of approach, that is they do not intersect. The plane on which the axes of rotation of drums 6 and 7 is located is inclined so that tangents to the paths of travel of the beater elements at the highest points are coincident or approximately so. An inclined supporting grate like structure 20 suitably secured to the frame of the machine, is arranged between the drums. Said structure comprises a plurality of spaced parallel members between which the beater elements of drums 6 and 7 are free to move.

The arrangement just described results in a construction providing a substantial space or depression between the paths of travel of the beater elements the lower limits of which are defined by the inclined supporting structure 20. It is this space that the carcass occupies during the operation of the machine. Said arrangement constitutes an important part of this invention.

The carcasses are fed to the dehairing machine by means of a swinging feeder 21, comprising a plurality of spaced tines 22 secured to a shaft 23 in any suitable manner and bolted together to form a frame by a bolt 24 that traverses openings in said tines and spacing sleeves 25. A scalding tank 26 is preferably arranged adjacent the dehairing apparatus of this invention and the feeder 21 lifts the carcasses in succession from said tank and causes them to roll over a downwardly inclined chute or surface 26 to the dehairing drums above described.

Secured to shaft 23, at one end thereof, is a crank arm 27 provided with a pin 28 slidably mounted in a slot 29 in one end of a link 30 that is pivotally attached at its other end to a disk 31 adjacent the periphery thereof. Disk 31 is secured to a shaft 32 journaled in bearings 33 and 34, secured to the frame of the machine in any suitable way. Loosely mounted on shaft 32 at the end opposite the disk 31 is a sleeve 35 passing through bearing 33. Said sleeve is provided with a clutch head 36 adjacent one side of bearing 33. Secured to the end of sleeve 35 at the other side of said bearing is a sprocket wheel 37. A clutch element 38 is slidably keyed to shaft 32, and urged toward clutch head 36 by a spring (not shown). Normally members 36 and 38 are held out of engagement by a rib 39 carried by member 38 engaging a shoulder 40 on a lever 41 pivoted at 42 to bearing 33. Rib 42 has oppositely inclined cam surfaces 43 (Figure 2) for a purpose to be presently described. Sprocket 37 is driven from a sprocket wheel 44 keyed to shaft 8 by means of a sprocket chain 45. The tension of this chain may be adjusted by bodily adjusting an idler sprocket 46 engaging said chain. Said sprocket is carried on the end of an arm 47 pivoted to the frame of the machine at 48. Arm 47 is provided with an ear 49, to which is pivoted an adjusting rod 50 having a threaded end 51 passing through an opening in the frame of the machine. A nut 52 serves to swing arm 47 on its pivot 48 and to thus bodily adjust the tensioning sprocket 46.

The discharge of the carcasses from the dehairing machine is controlled by a gate 53 composed of bars 54, secured fixedly and non-rotatively in spaced relation on a shaft 55 journaled in bearings 56 carried by the frame 11 of the machine.

Bars 54 are held in proper relation by being secured to an angle bar 57 in any suitable manner. Journaled in plates 58 secured to the end bars 54 of gate 53 is a shaft 59 carrying a plurality of beater arms 60 arranged between said bars. Each of arms 60 is fixedly secured to shaft 59 between its ends and has secured to each of its ends a beater element or blade 61. Arms 60 may be made of heavy canvas, wood, or of metal, as may be desired.

Secured to shaft 59 adjacent an end thereof is a sprocket wheel 62 in alignment with a sprocket wheel 63 secured to or formed integrally with a larger sprocket wheel 64 rotatively mounted on the end of shaft 55. A sprocket chain 65 operatively connects sprocket wheels 62 and 63.

Wheel 64 is driven from wheel 66 secured to a shaft 67, journaled on the frame of the machine, by a chain 68. Power is transmitted to shaft 67 by a sprocket wheel 69 secured to said shaft and driven from a sprocket 70 on drive shaft 8 by a chain 71.

An arm 72 is secured to shaft 55 externally of the frame of the machine, to control the swinging movement of gate 53. A cable 73, secured to the free end of arm 72, is provided to manually swing arm 72 and thus swing shaft 55 and the gate 53 secured thereto. In order to facilitate the manual operation of said gate a counterweight 74 is provided. Said weight is, preferably, attached to arm 72 by means of a cable 75 secured at 76 to said arm, passed over idler pulleys 77 and 78 and secured at 79 to said weight.

A discharge chute 80 is provided at the discharge side of the machine. Preferably the discharge level 81 of said chute is substantially in alignment with the top of a gambreling table, so arranged that the carcasses are discharged from the dehairing machine to said table without necessitating the manual handling thereof.

Power from any suitable source is applied to the machine by pulleys 82, one of which is secured to one end of shaft 8 and the other of which is loose thereon. At the other end of shaft 8 a sprocket wheel 83 is secured thereto, said wheel being operatively connected to a smaller sprocket wheel 84 fixed on shaft 12 by a chain 85. The tension of chain 85 may be adjusted by bodily adjusting an idler 86 contacting with said chain between wheels 83 and 84. Idler 86 is mounted for such adjustment on the end of an arm 87 pivoted at 88 on the frame of the machine. A rod 89 secured to arm 87 and passing through an opening in the frame controls the movement of said arm, a nut 90 engaging the threaded end 91 thereof being provided to maintain the adjustment.

*Operation*

The shafts 8, 12, 59 and sleeve 35 are continuously rotated by the mechanism above described. The beater drums 6 and 7, as well as the beater mechanism carried by shaft 59 are thus continuously rotated. When it is desired to feed the carcass of a hog to the machine from tank 26, the operator manipulates, by suitable mechanism arm 41, withdrawing shoulder 40 from rib 39. The clutch members 36 and 38 engage causing the shaft 32 to rotate disk 31 that in turn, through link 30, causes crank arm 27 to swing the feeder 21 upwardly carrying the carcass up above the inclined surface 26 over which it rolls under the action of gravity to the space between the beater drums. The shaft 32 makes but a single revolution since the inclined surface 43 on clutch member 38 serves to automatically retract said member from its engagement with clutch member 36 when a revolution is completed, by engaging the shoulder 40 which drops in its path gravitationally when the operator releases lever 41 after initiating the operation of the machine. The feeder accordingly automatically stops after each feeding operation.

The carcass rolls to a position between the beater drums 6 and 7 that rotate continuously as above stated causing the beating elements 15 to engage the carcass and remove the hair. At the same time said elements spin the carcass around a substantially longitudinal axis. As the drum 7 rotates more rapidly than drum 6, and as its blades 15 engage the carcass at a sharper angle with respect to the surface thereof than do the blades 15 on drum 6, due to the fact that the diameter of drum 7 is materially smaller than the diameter of drum 6, the carcass has a tendency to move bodily toward the discharge chute 80. Normally, however, the carcass will remain in the depression or pocket between the drums caused by the fact that they are spaced apart and the carcass may rest upon the inclined support 20 that is inclined in a direction to cause the carcass to remain in contact with the beating elements on the larger drum 6. The carcass is accordingly operated upon primarily between the drums and in this position the beater elements 15 engage the surface of the carcass at an angle found to be very effective in performing the dehairing operation. When the carcass is bodily moved out of the depression formed between the drums due to the spinning forces that tend and occasionally do move it in that direction toward the discharge side of the machine, it strikes the gate 53 and the rotating beaters 60, 61 cause it to be forced back into said depression, said beaters assisting in the dehairing operation. It will thus be seen that the position of the carcass during the dehairing operation is substantially predetermined by the arrangement of the dehairing elements as above outlined. And such position is the position that has been found in practice to be productive of high efficiency, not only in improving the character of the results produced but in reducing the time necessary to complete the dehairing operation.

After the dehairing operation is completed the operator raises the gate 53 by manipulating control cable 73. The carcass is then automatically ejected to the gambreling table over the larger drum 6.

The invention may be embodied in other specific forms without departing from the spirit or essential characteristics thereof, and the present embodiment is therefore to be regarded in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is—

1. A carcass dehairing machine comprising a plurality of rotary beater mechanisms embodying flexible beater arms and of varying diameters arranged to rotate about centers so disposed that said beater arms follow non-intersecting paths and so that horizontal lines tangent to said paths at their highest points are approximately coincident.

2. The combination defined in claim 1 including an inclined supporting grating arranged between said beater mechanisms with its inclination extending downwardly toward the center of the larger beater mechanism and with its mid point roughly in horizontal alignment with the center of the smaller beater mechanism.

3. A carcass dehairing machine comprising a plurality of rotary beater mechanisms embodying flexible beater elements arranged so that the paths of rotation of said beater elements do not intersect and an inclined carcass support arranged between said mechanisms longitudinally of a line passing through their axes.

4. A carcass dehairing machine comprising a plurality of drums, beater elements secured to each of said drums, the operative ends of said elements extending substantially radially of said drums, the drums being so arranged that said ends follow non-intersecting paths providing a depression between them to receive the carcasses, and an inclined carcass supporting grate limiting the depth of said depression.

5. A carcass dehairing machine comprising means to feed carcasses successively to said machine, a plurality of beater drums carrying flexible beater elements arranged to rotate in non-intersecting paths providing a depression between them to receive the carcasses delivered by said feeding means, one of said beater drums being of smaller diameter than the other drum to push said carcasses from said depression toward the discharge side of the machine, a gate to control the discharge of said carcasses, and mechanism to rotate said drums.

6. The combination defined in claim 5 including a rotating beater mechanism carried by said gate.

7. A carcass dehairing machine comprising a plurality of beater drums carrying flexible beater elements secured to the periphery thereof, said drums being arranged so that the beater elements thereon move in non-intersecting paths whereby a pocket or depression is formed between said drums, a stationary support between said drums forming the bottom of said pocket to limit the movement of the carcasses therebetween, means to rotate said drums, means to feed the carcasses one at a time to said pocket from one side of the machine, and means to control the discharge of the carcasses from the other side of said machine.

8. The combination defined in claim 7 in which the beater drums are arranged so that said paths are substantially spaced apart at their nearest point of approach to each other.

9. The combination defined in claim 7 in which the beater drums are of varying diameter, the smaller drum being adjacent the feed side of the machine and rotated more rapidly than the larger drum.

10. The combination defined in claim 7 in which the beater drums are of differing diameters but have their axes arranged so that tangents to said paths at the highest points thereof are located approximately in the same plane.

11. A carcass dehairing machine including beater means to dehair the carcasses successively and move them toward the discharge side of said machine, a gate to control the discharge of the carcasses from the machine, and a rotary beater mechanism carried by said gate and arranged to cooperate with said beater means.

12. A carcass dehairing machine comprising a pair of beater drums carrying beater elements, means to feed the carcasses intermittently into position to be acted upon by said elements, a swinging discharge gate arranged with its free end in proximity to the path of movement of the beater elements on one of said drums, and a rotating beater carried by said gate adjacent said end arranged to cooperate with said beater drums in dehairing the carcass and in controlling the movements thereof.

13. The combination defined in claim 12 in which the beater drums are rotated at different speeds, the speed of the drum nearest said gate being substantially less than the speed of the other drum whereby the carcass has a tendency to move toward said gate under the influence of the more rapidly moving drum.

14. The combination defined in claim 12 in which the drums are of differing diameter with their axes of rotation arranged so that the uppermost points in the paths of movement of the beater elements on said drums lie approximately in the same horizontal plane.

15. The combination defined in claim 12 in which the drums are spaced apart so that the paths of movement of the beater elements do not intersect and in which the drum adjacent the free end of said gate rotates more slowly than the other of said drums, whereby the carcasses tend to move from between said drums toward said gate.

16. The combination defined in claim 12 in which the beater elements are flexibly mounted on said drums, the flexibility being greater in a direction away from said drum than toward it.

17. A carcass dehairing machine including beating mechanism and a swinging gate to control the discharge of the carcasses from said mechanism, rotating beater arms carried by said gate, and manually operable means to swing said gate away from said mechanism to permit the discharge of the carcasses from the machine.

In testimony whereof I affix my signature.

JOHN W. KOHLHEPP.